(12) United States Patent
Becker

(10) Patent No.: US 6,816,823 B2
(45) Date of Patent: Nov. 9, 2004

(54) PROCESS FOR DESIGNING FLIGHT CONTROLLERS

(75) Inventor: Juergen Becker, Munich (DE)

(73) Assignee: EADS Deutschland GmbH, Munich (DE)

( * ) Notice: Subject to any disclaimer, the term of this patent is extended or adjusted under 35 U.S.C. 154(b) by 703 days.

(21) Appl. No.: 09/805,896

(22) Filed: Mar. 15, 2001

(65) Prior Publication Data

US 2001/0023394 A1 Sep. 20, 2001

(30) Foreign Application Priority Data

Mar. 15, 2000 (DE) .......................................... 100 12 517

(51) Int. Cl.$^7$ .......................... G06G 7/48; G06F 17/50; G06F 7/60
(52) U.S. Cl. ................... 703/8; 703/1; 703/2; 244/194; 244/203; 244/76 R; 244/76 C; 244/75 R; 416/1; 416/23; 701/3; 701/16; 701/36
(58) Field of Search .............................. 703/1, 2, 7, 8, 703/13; 244/194, 203, 76 R, 76 C, 75 R; 416/1, 23; 701/3, 16, 36; 700/28, 29, 71, 31, 32, 30

(56) References Cited

U.S. PATENT DOCUMENTS

| | | | | |
|---|---|---|---|---|
| 3,752,420 A | * | 8/1973 | Osder | 244/181 |
| 3,857,535 A | * | 12/1974 | Osder | 244/195 |
| 3,903,614 A | * | 9/1975 | Diamond et al. | 434/45 |
| 4,504,233 A | * | 3/1985 | Galus et al. | 434/45 |
| 4,567,564 A | * | 1/1986 | Bittner et al. | 701/4 |
| 4,725,020 A | * | 2/1988 | Whitener | 244/76 R |
| 4,729,528 A | * | 3/1988 | Borzachillo | 244/90 R |
| 5,150,861 A | * | 9/1992 | Merkel et al. | 244/91 |
| 5,222,699 A | * | 6/1993 | Albach et al. | 244/213 |
| 5,374,011 A | * | 12/1994 | Lazarus et al. | 244/75 R |
| 5,971,328 A | * | 10/1999 | Kota | 244/219 |
| 6,138,956 A | * | 10/2000 | Monner | 244/215 |
| 6,322,324 B1 | * | 11/2001 | Kennedy et al. | 416/1 |
| 6,416,017 B1 | * | 7/2002 | Becker | 244/76 C |
| 6,694,196 B2 | * | 2/2004 | Tuttle et al. | 700/28 |

FOREIGN PATENT DOCUMENTS

DE    198 41 632    3/2000

* cited by examiner

Primary Examiner—W. D. Thomson
(74) Attorney, Agent, or Firm—Crowell & Moring LLP

(57) ABSTRACT

Process for designing flight controllers, in which first for the rigid airplane and then for the elastic airplane the damping and the phase delay for each excitation frequency is determined, and the flight controller is adapted in such a manner that the structural responses to each excitation frequency for both the rigid airplane and the elastic airplane in the open control circuit outside two design fields, applicable to the elastic airplane, are laid around the instability points in the data field comprising damping and phase delay, whereby for the design of the elastic airplane between the phase delays of −270 degrees and −495 degrees, a damping exceeding −6 dB is allowed.

2 Claims, 2 Drawing Sheets

PROCESS FOR DESIGNING FLIGHT CONTROLLERS

BACKGROUND AND SUMMARY OF THE INVENTION

This application claims the priority of German Application No. 100 12 517.4, filed Mar. 15, 2000, the disclosure of which is expressly incorporated by reference herein.

The invention relates to a process for designing flight controllers.

In modern controlled airplanes there exists the requirement to compensate for severe structural vibrations, especially with the use of ever softer airplane structures.

German Patent document DE 198 41 632.6 discloses a process to compensate for the structural vibrations of an airplane arising from turbulence and buffeting, where the structural vibrations are detected, according to a measuring method, by means of the rotational speeds that are determined by an inertial sensor system. The detected rotational speeds are fed to the flight control system, and control flap movements are produced, according to phase and amplitude, for the purpose of minimizing the phases and amplitudes of the excited vibrations. The design of flight control systems is known from the military specification MIL-A-8868B for the elastic airplane and from MIL-F-8785B for the rigid airplane, where the open circuit diagrams for phase delay and damping generally specify an amplitude margin of 6 dB and, independently thereof, a phase margin of at least +/−45 degrees.

The object of the invention is to provide a process for designing a flight controller that is suitable especially for soft airplane structures.

This problem is solved by a process for designing flight controllers, in which first for the rigid airplane and then for the elastic airplane the damping and the phase delay for each excitation frequency is determined. The flight controller is adapted in such a manner that the structural responses to each excitation frequency for both the rigid airplane and the elastic airplane in the open control circuit outside two design fields, applicable to the elastic airplane, are located around the instability points in the data field comprising damping and phase delay, whereby for the design of the elastic airplane between the phase delays of −270 degrees and −495 degrees, a damping exceeding −6 dB is allowed. Other embodiments are described herein.

Other objects, advantages and novel features of the present invention will become apparent from the following detailed description of the invention when considered in conjunction with the accompanying drawings.

DETAILED DESCRIPTION OF THE DRAWINGS

Figure 1:
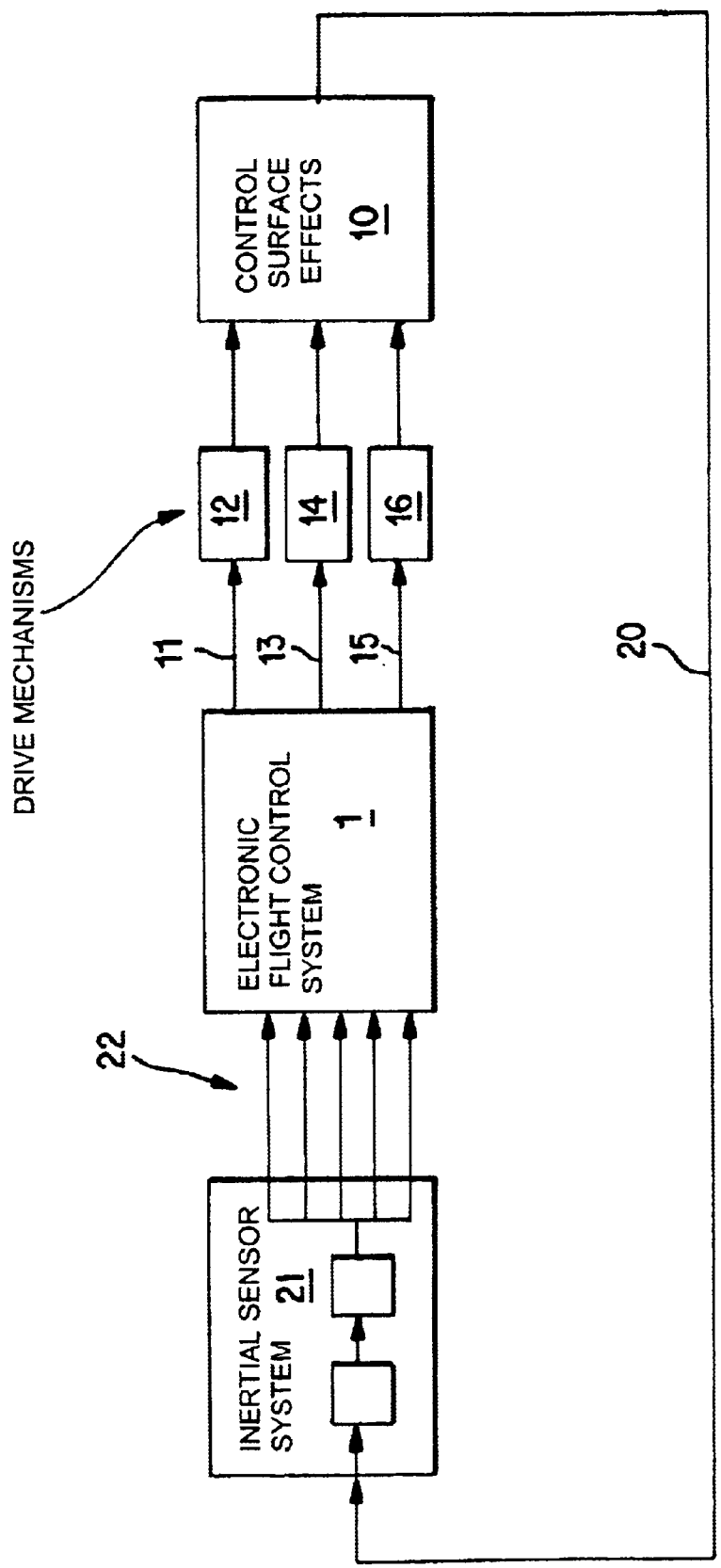
FIG. 1 is a block diagram of a schematic representation of the functional operation of a flight controller.

FIG. 1 depicts an electronic flight control system 1, which is connected by means of at least one data connection 11 to one or more regulating drive mechanism(s) 12 for the airplane's elevators, by means of a data connection 13 to the regulating drive mechanisms 14 for the airplane's ailerons, and by means of a data connection 15 to the rudder regulating drive mechanisms 16. The effects from these control surfaces arising from the airplane's behavior are represented symbolically with the functional block 10. The airplane behavior is detected of an inertial sensor system 21, assigned to the flight control system, a state that is represented symbolically with the connecting line 20. The inertial sensor system 21 in turn is connected by means of analogous signal lines 22 to the flight control system 1. To dampen the structural vibrations arising from turbulence and buffeting, the rotational speeds, detected in the inertial system 21, are used.

In the flight controller, individual notch filters or structural filters, phase derivative filters and regulating amplifiers are used, in order to dampen those elastic shapes that are not considered in the vibration damping. So-called inverse notch filters can also be provided that reinforce the elastic shapes under discussion. These notch filters also enable a phase shift (that is supposed to be optimized in a design) whose purpose is to stabilize the elimination of electric signals over the inverse notch filter. The phase derivative filters serve to reverse the low frequency phase losses, generated by the notch filters, so that the inventive stability criteria for the dynamics of the rigid and controlled airplane can be obtained.

The aforementioned components of the controller are used in such a manner, according to the level of skill in the field of control systems, that the design criteria for the flight controller, described below, can be obtained.

Figure 2:
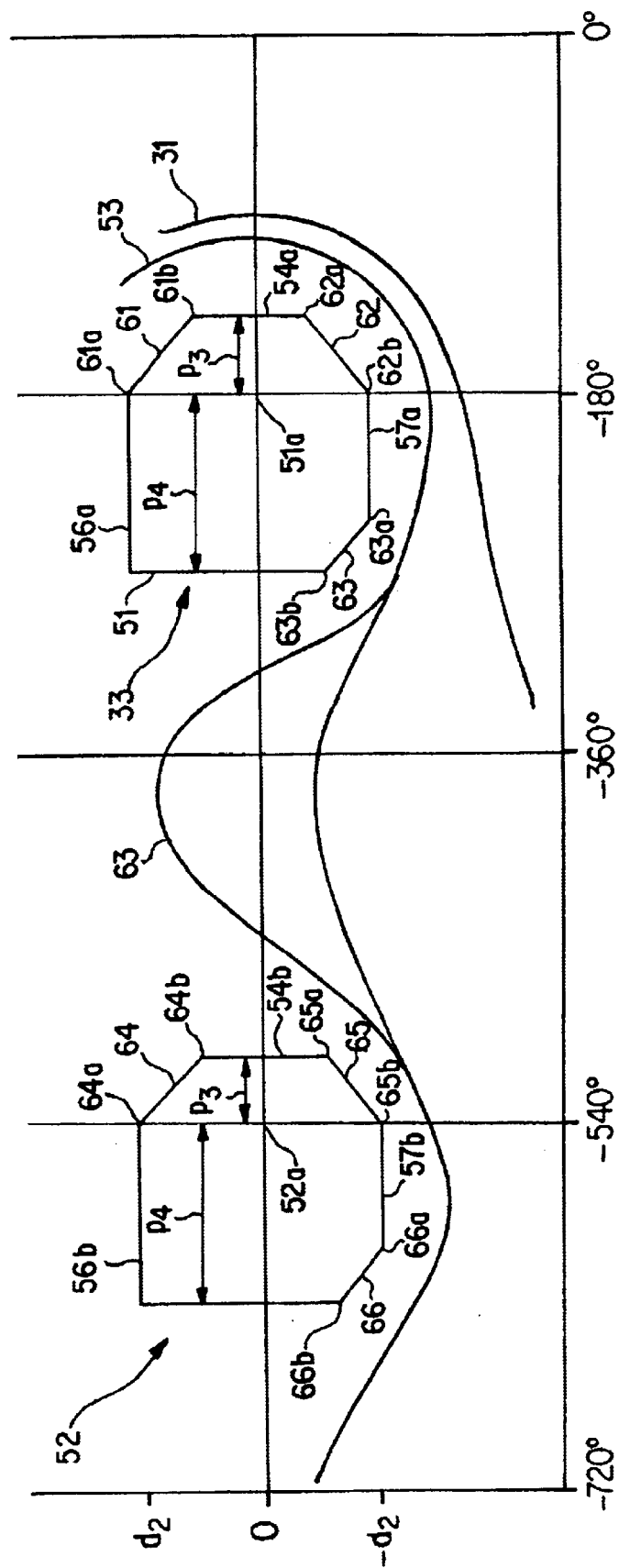
FIG. 2 is an open circuit diagram for an airplane model, where the elastic vibrations are taken into consideration for the purpose of describing the design criteria of the invention.

FIG. 2 describes the inventive open circuit design criteria for the flight controller. These criteria are based on the rigid airplane, i.e., the airplane including a controller without any regard for the elastic vibrational shapes, and the elastic airplane, i.e., the airplane including a controller with regard to the elastic vibrational shapes. In the diagram, the phase delay is plotted on the abscissa and the gain is plotted in dB on the ordinate. The curve 31 of the rigid airplane shows the phase delay and the damping of the rigid airplane with the controller for increasing excitation frequencies. This curve or the response characteristic of the rigid airplane 31 is determined via a simulation using a rigid airplane model. A design field 51 or open circuit criterion 33 that applies to areas of the rigid airplane defines a criterion in terms of area as a function of the damping and phase delay, which states according to the invention, which pair of values from the damping and phase delay for the rigid airplane model with the controller may not occur. This field is formed around a reference point or instability point 51a, which is defined by the pair of values having a phase delay of −180 degrees and a gain of 0 dB.

With respect to the behavior of the elastic airplane with the controller and the aforementioned filters the invention provides, besides the design field 51, another design field 52. The design fields or criteria areas 51, 52 are open circuit criteria, which are applicable to areas of the rigid airplane and defined as a function of the damping and the phase delay in a phase diagram. The curve 53 of the response characteristic of the elastic airplane with controller may not touch or travel through the fields 51, 52.

The fields 51, 52 are generally designed in such a manner—that is, with respect to their minimum limits—that their minimum limits represent parabolically closed curves that are symmetrical to the damping zero line. These curves start from the respective instability point, that is, from the instability point 51a with a phase delay of −180 degrees and a damping of 0 dB or around the instability point 52a with a phase delay of −45 degrees and damping of 0 dB. The boundaries of the fields 51, 52 are defined by a uniform direction of curvature along the circumferential lines of the same and by the corner points −90 degrees and +45 degrees with respect to the phase delay and +/−4 dB with respect to the damping. The fields are formed preferably in the shape of a polygon in order to have a clear definition of all of the limits of the same at each point. Thus, the invention involves a process for designing flight controllers, where first for the rigid airplane and then for the elastic airplane the damping and the phase delay for each excitation frequency is determined; and the flight controller is adapted in such a manner that the structural responses to each excitation frequency outside the design fields (51, 52), applicable to both the rigid and the elastic airplane, are laid around the instability points in the data field of damping and phase delay, thus permitting for the design of the controlled airplane between the phase delays of −270 degrees and −495 degrees for damping values that exceed −6 dB. Thus, the curve 53 can exhibit a bulge between the fields 51, 52, as depicted by the segment 63 in FIG. 2.

In the preferred configuration of the fields as polygons 51, 52, the first design field 51 is formed around the instability point 51a with a phase delay of −180 degrees and damping of 0 dB, whereas the second design field forms around the instability point 52a with a phase delay of −540 degrees and gain of 0 dB. Both design fields 51, 52 form around the respective instability points, first with a constant upper phase boundary 54a or 54b, which lies at a phase distance p3 from the respective instability point 51a or 52a. The phase distance p3 is at a minimum +30 degrees so that the upper phase boundary 54a, 54b is at −150 degrees or −510 degrees phase delay. Preferably, p3 is 45 degrees and a maximum of 60 degrees. Furthermore, the design fields 51, 52 are defined by a bottom phase boundary, which, starting from the respective instability point 51a, 52a, lies at a phase distance p4 in the negative direction. Preferably, the value p4 is 90 degrees so that the bottom phase boundaries in the phase diagram exhibit a phase delay of −270 degrees or −630 degrees. The value p4 is a minimum of 60 degrees and a maximum of 120 degrees. The suitable values for p3 and p4 depend on the application, that is, on the airplane to be designed and the softness of its structure.

Furthermore, the design fields 51 and 52 are defined with respect to damping by means of the horizontal boundaries in the open circuit diagram. The invention specifies a damping d2 as the upper damping boundary 56a or 56b and a damping −d2 as the bottom damping boundary 57a or 57b. The value of d2 is preferably 6 dB and is a minimum of 4 dB. The damping boundaries can vary depending on the application.

The design fields 51, 52 are decreased, for example, with 45 degree slopes at their corners in order to prevent the edge areas from lying disproportionately far from the instability points 51a, 52a and to prevent a design line 53 from lying unnecessarily far from the instability points.

Thus, the design field 51 exhibits for the preferred values for p3, p4, and d2 a first chamfering 61 with the corner point 61a, defined by the pair of values (+d2 dB, −180 degrees) and with the corner point 61b, defined by the pair of values (+0.5·d2 dB, −180 degrees +p3). Furthermore, the design field 51 exhibits a second chamfering 62 with the corner point 62a, defined by the pair of values −(0.5·d2 dB, −180 degrees +p3), and by the corner point 62b, defined by the pair of values (−d2 dB, −180 degrees). A third chamfering 63 exhibits a corner point 63a, defined by the pair of values (−d2dB, −180 degrees, −0.75·p4), and a corner point 63b, defined by the pair of values (+0.5·d2 dB, −180 degrees −p4). The chamferings 61, 62, 63 can also be formed by curves.

Similarly the design field 52 exhibits at the edge areas reductions, which are formed preferably as the chamferings 64, 65, 66. Hence, the edges of the design fields are sloped by 45 degrees at least starting from the damping of (+/−2/3·d1). In detail, a first chamfering 64 is provided with the corner point 64a, defined by the pair of values (+d2 dB, −540 degrees), and the corner point 64b, defined by the pair of values (+05·d2 dB, −540 degrees+p3). Furthermore, the design field 52 exhibits a second chamfering 65 with the corner point 65a, defined by the pair of values −(0.5·d2 dB, −540 degrees+p3), and with the corner point 65b, defined by the pair of values (−d2 dB, −540 degrees). A third chamfering 66 exhibits a corner point 65a, defined by the pair of values (−d2 dB, −540 degrees −0.75·p4), and a corner point 65b, defined by the pair of values (+0.5·d2 dB, −540 degrees −p4). The chamferings 64, 65, 66 can also be formed by curves.

The dynamic design of the controller for the elastic airplane is implemented at this stage in such a manner that the design line 53 for all excitation frequencies does not touch or cross the design fields 51, 52. Between the design fields 51, 52, the design curve 53 can also exhibit a bulge 63 as long as it does not touch or cross the design fields 51, 52. Of course, the design curve 63 can only be designed in such a manner that the dynamic loads of a control surface and an adjoining point are not exceeded. However, the goal is to have the design curve 53, 63 move as far as possible upward, that is, to the highest possible gains, since the results are then a higher reduction, that is vibration damping.

By allowing amplitudes and phase states exceeding a damping of 6 dB in certain areas, the dynamic design requirements are significantly reduced so that significantly fewer measures with respect to the structure or the airplane systems are required as compared to the design process according to the state of the art.

The notch filters, phase derivative filters and regulating amplifiers as well as inverse notch filters are adapted in such a manner according to the prior art methods that the design curves 31 or 53, 63 do not enter the related design fields 33 or 51, 52 and do not touch them. Correspondingly, the notch filters and the inverse notch filters are set up individually as the numerator and denominator polynomials in the analogous frequency area. To incorporate into the flight computer, they are modified. The individual frequency response is optimized in such a manner at the intersection in the entire open circuit signal that the stability criteria are guaranteed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for designing a flight controller, the process comprising the acts of:
   determining a damping and phase delay for each excitation frequency first for a rigid airplane and then for an elastic airplane;
   adapting the flight controller such that structural responses to each excitation frequency for both the rigid airplane and the elastic airplane in an open control circuit outside of two design fields, applicable to the elastic airplane, are located around instability points in a data field comprising the damping and phase delay; and wherein for the design of the elastic airplane a damping exceeding −6 dB is allowed between the phase delays of −270 degrees and −495 degrees.

2. The process for designing a flight controller according to claim 1, wherein a design curve for the rigid and elastic airplane must be located below and/or aside of a first and a second of said two design fields due to a corresponding adaptation of the flight controller;

further wherein the first design field is formed by data points determined by a gain and the phase delay arising from an excitation of the airplane: (+c, −270 degrees), (+c, −180 degrees), (+c/2, −135 degrees), (−c/2, −135 degrees), (−c, −180 degrees), (−c, −240 degrees), (−2/3 c, −270 degrees); and further wherein the second design field is determined by the following data points: (+c, −630 degrees), (+c, −540 degrees), (+c/2, −495 degrees), (−c/2, −495 degrees), (−c, −540 degrees), (−c, −600 degrees), (−2/3, −630 degrees);

where edges of the two design fields are chamfered by 45 degrees, starting from at least a damping of (+/−2/3·d1); and where the value c is at least 4 dB and the value d1 is at least 4 dB.

* * * * *